May 5, 1942.　　　O. M. WHITTEN　　　2,281,898

FRICTION COUPLING DISK

Filed July 22, 1940

INVENTOR.
Owen M. Whitten
BY
ATTORNEY.

Patented May 5, 1942

2,281,898

UNITED STATES PATENT OFFICE 2,281,898

FRICTION COUPLING DISK

Owen M. Whitten, Detroit, Mich., assignor to Kelsey-Hayes Wheel Company, Detroit, Mich., a corporation of Delaware Application July 22, 1940, Serial No. 346,817

2 Claims. (Cl. 192—107)

The invention relates to disks of friction couplings and refers more particularly to clutch disks especially for use in motor vehicles.

The invention has for one object to provide an improved disk which is flexible in directions radially, axially and peripherally of the disk.

The invention has for another object to provide a simple construction for limiting the flexing in a peripheral direction.

With these and other objects in view, the invention resides in the novel features of construction and combinations and arrangements of parts as more fully hereinafter set forth.

In the drawing—

Figure 1:
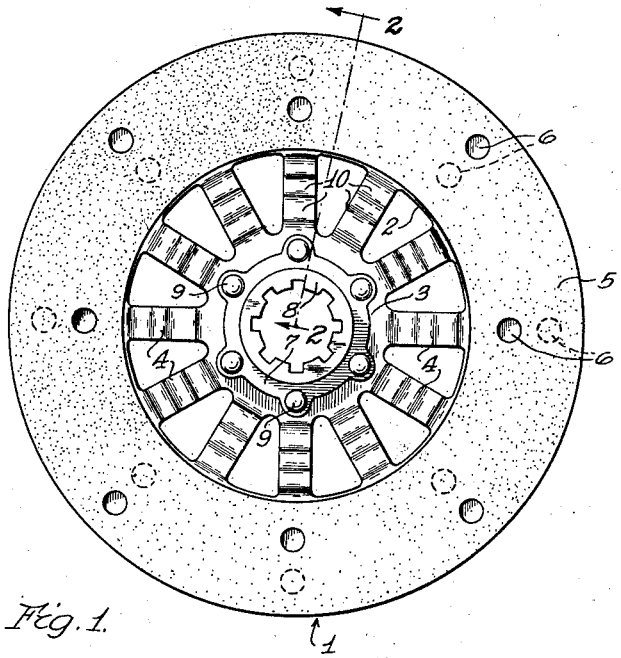
Figure 1 is a side elevation of a disk embodying my invention.
Figure 2:
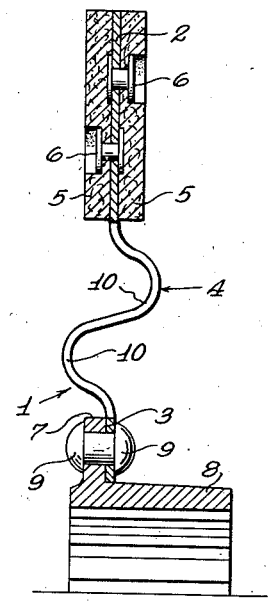
Figure 2 is an enlarged cross section on the line 2—2 of Figure 1.

Referring to Figures 1 and 2, 1 is a circular resilient disk preferably formed of sheet steel. The disk is of one piece construction and is adapted for use as the driven disk of a friction clutch especially for use in coupling the engine of a motor vehicle to its drive wheels. The disk comprises the endless rim portion 2, the endless hub portion 3 and the integral spokes 4 extending radially between the rim and hub portions. The rim portion has secured to its opposite faces suitable friction lining 5, the securing means being in the nature of the rivets 6. The hub portion is attached to the fixed radial flange 7 of the hub 8 by suitable means, such as the rivets 9.

For the purpose of providing flexibility between the rim and hub portions in directions radially, axially and peripherally of the disk, each of the spokes is transversely corrugated along its length to provide the plurality of generally U-shaped bends 10. The bends preferably extend equal distances on opposite sides of the median plane of the disk. By varying the thickness of the metal, the number of the spokes, their profile and the axial dimensions of their bends, their flexibility is varied and also a wide range of torque capacity of the disc can be secured.

Figure 3:
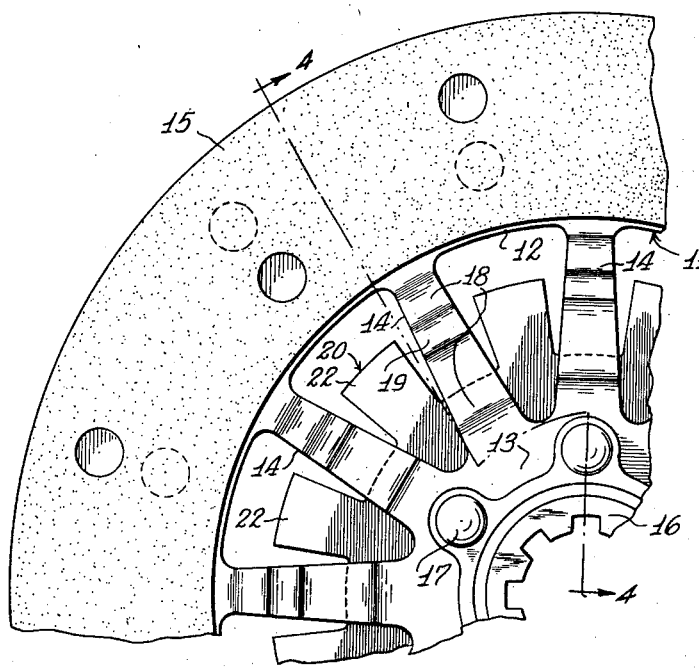
Figure 3 is a view similar to Figure 1 showing a modification.
Figure 4:
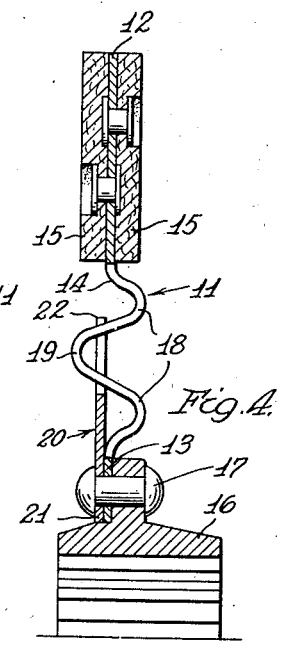
Figure 4 is a cross section on the line 4—4 of Figure 3.

Figures 3 and 4 disclose another modification in which the disk 11 has the endless rim portion 12, the endless hub portion 13 and the integral radial spokes 14 extending between the rim and hub portions. The rim portion has secured to its opposite faces the friction lining 15 and the hub portion is attached to the hub 16 by means of the rivets 17 which extend through the fixed radial flange of the hub and the hub portion. Each of the spokes is axially corrugated along its length to provide the generally U-shaped bends 18 and 19. As shown, there are two bends 18 and one bend 19 and the axial extent of each from the median plane of the disk is the same. By reason of the construction of spokes, the desired radial, axial and peripheral flexibility is secured.

To limit the flexing of the spokes peripherally and to increase the torque capacity of the disk, I have provided the helper disk 20 which has the hub portion 21 secured to the hub 16 by the rivets 17, the hub portion 13 of the disk 11 being preferably between the fixed flange of the hub and the hub portion of the helper disk. The helper disk also has the integral fingers 22 extending radially from the hub portion 21 opposite the spaces between the spokes 14 and extending between the edges of the spokes at the bends 19 to engage these edges when the spokes have flexed peripherally a sufficient amount.

From the above description, it will be seen that I have provided a simple construction of friction coupling disk and, more particularly clutch disk, which is flexible in radial, axial and peripheral directions to absorb shock and provide for bearing misalignment. It will also be seen that the disk can have a wide range of torque capacity. It will be further seen that I have provided a simple arrangement for limiting the peripheral flexing, at which time the disk serves as a positive drive connection.

What I claim as my invention is:

1. In a friction coupling disk, a hub, a disk comprising a hub portion attached to said hub, a rim portion, and integral spokes extending between said hub and rim portions and having bends extending generally axially of said disk to provide flexibility between said portions in directions radially, axially and peripherally of said disk, and a generally radially extending member fixed to said hub and having portions engageable with the edges of certain of said spokes at said bends to limit the flexing thereof peripherally of said disk.

2. A friction coupling disk comprising a rim portion, a hub portion, means extending between and connecting said portions to provide flexibility therebetween in directions radially, axially and peripherally of said disk, said means consisting solely of spokes all having at least one generally axially extending bend therein, a hub to which said hub portion is attached, and a disk attached to said hub and having generally radially extending finger portions engageable with an edge of the generally axially extending bend of certain of said spokes to limit flexing thereof in a direction peripherally of said disk.

OWEN M. WHITTEN.